United States Patent
Nitschke et al.

(10) Patent No.: US 7,400,641 B2
(45) Date of Patent: Jul. 15, 2008

(54) BUS MASTER FOR A BUS FOR CONNECTION OF SENSORS AND/OR IGNITION MEANS

(75) Inventors: Werner Nitschke, Ditzingen (DE); Klaus-Dieter Meier, Leonberg (DE); Knut Balzer, Beilstein (DE); Ewald Mauritz, Weissach (DE); Heiko Buehring, Oldenburg (DE); Hans Bogenrieder, Ingolstadt (DE); Bernd Pfaffeneder, Lappersdorf (DE); Hölger Wulff, Ingolstadt (DE)

(73) Assignees: Robert Bosch GmbH, Stuttgart (DE); Conti Temic Microelectronics GmbH, Numberg (DE); Siemens AG, Munich (DE)

( * ) Notice: Subject to any disclaimer, the term of this patent is extended or adjusted under 35 U.S.C. 154(b) by 810 days.

(21) Appl. No.: 10/473,502

(22) PCT Filed: Mar. 28, 2002

(86) PCT No.: PCT/DE02/01142

§ 371 (c)(1),
(2), (4) Date: Mar. 22, 2004

(87) PCT Pub. No.: WO02/080463

PCT Pub. Date: Oct. 10, 2002

(65) Prior Publication Data

US 2004/0148081 A1    Jul. 29, 2004

(30) Foreign Application Priority Data

Mar. 29, 2001 (DE) ............................ 101 15 409

(51) Int. Cl.
*H04L 12/413* (2006.01)
*H04L 29/00* (2006.01)

(52) U.S. Cl. ............ 370/445; 370/446; 370/447; 701/45; 701/47; 340/825.25; 180/282; 709/208; 709/209

(58) Field of Classification Search ............ 380/825.21, 380/825.25; 180/252
See application file for complete search history.

(56) References Cited

U.S. PATENT DOCUMENTS 5,187,709 A * 2/1993 Williamson et al. ......... 370/445

(Continued)

FOREIGN PATENT DOCUMENTS

DE    3 826 774    2/1990

(Continued)

OTHER PUBLICATIONS

Machine translation of IDS reference DE 42 42 438 from Europea Patent Office, 3 pages.*

(Continued)

*Primary Examiner*—Thomas G. Black
*Assistant Examiner*—Lin B Olsen
(74) *Attorney, Agent, or Firm*—Kenyon & Kenyon LLP

(57) ABSTRACT

A bus master for a bus for connection of sensors and/or an ignition means device, which has at least two bus driver arrangements allowing data to be received independently of one another. For this purpose a polling operation, specifically using a multiplexer or a demodulator associated through one of the particular bus driver arrangements, is used. Furthermore, a state machine is provided, which also alternatingly determines the system status on the basis of the measured quantities determined on the bus conductor for the particular bus driver arrangement. In a refinement, a particular bus driver may have a dedicated processor for system status determination.

3 Claims, 2 Drawing Sheets

U.S. PATENT DOCUMENTS

| | | | |
|---|---|---|---|
| 5,307,340 A * | 4/1994 | Inoue et al. | 370/245 |
| 5,384,769 A * | 1/1995 | Oprescu et al. | 370/276 |
| 5,467,272 A * | 11/1995 | Yoshida et al. | 701/1 |
| 5,964,815 A | 10/1999 | Wallace et al. | |
| 6,624,738 B2 * | 9/2003 | Bracklo et al. | 340/3.51 |

FOREIGN PATENT DOCUMENTS

| | | |
|---|---|---|
| DE | 42 42 438 | 6/1994 |
| DE | 44 01 785 | 7/1994 |
| DE | 195 25 180 | 7/1996 |
| DE | 692 18 653 | 11/1997 |
| EP | 0 507 428 | 10/1992 |
| JP | 2000201162 | 7/2000 |
| JP | 2000322101 | 11/2000 |
| WO | WO 91 17609 | 11/1991 |

OTHER PUBLICATIONS

Airbag 2000 conference lecture, K. Balzer et al., BST Deployment and Sensor Bus, Dec. 5, 2000, reproduced in the Conference Proceedings, p. 12-1 through 12-5.

* cited by examiner

BUS MASTER FOR A BUS FOR CONNECTION OF SENSORS AND/OR IGNITION MEANS

FIELD OF THE INVENTION

The present invention relates to a bus master for a bus for connection of sensors and/or an ignition arrangement.

BACKGROUND INFORMATION

U.S. Pat. No. 5,964,815 describes a bus system having a bus master or bus controller. An ignition arrangement and sensors are connectable to the bus.

The Airbag 2000 conference lecture K. Balzer et al.: *BST Deployment and Sensor Bus,* Dec. 5, 2000, reproduced in the Conference Proceedings, p. 12-1 through 12-5, describes another bus system, to which sensors and/or ignition means are connectable. This is a master/multislave system, a two-wire line being used as a bus. In addition, the power supply is modulated by the slaves, and the modulation is transmitted by the master via the bus when the slaves transmit their data via the bus. The master transmits a request to a slave to receive data from the slave. The slave then modulates its power consumption to generate the response to the master.

SUMMARY

An example bus master according to the present invention for a bus for connection of sensors and/or an ignition arrangement may have the advantage over the related art that data received simultaneously and independently of one another may be processed and analyzed by at least two bus driver arrangements, each including a respective bus driver, in the bus master. This separate analysis allows the bandwidth to be doubled while the data transmission rate remains unchanged. It is furthermore possible to use all previous bus elements, the example bus master according to the present invention being usable in any desired bus configuration, i.e., ring, spur, daisy chain, or parallel or mixed structures.

It may be particularly advantageous if a first multiplexer is associated with the at least two bus driver arrangements for relaying the data received over the bus alternatingly to a single demodulator for both bus driver arrangements. This corresponds to a polling operation and makes it advantageously possible to use a single demodulator for the data received by both bus driver arrangements. This simplifies the design of the bus master according to the present invention. The use of a buffer memory makes it possible to prevent loss of individual data.

As an alternative, a particular bus driver arrangement may be assigned a dedicated demodulator. This may ensure full independence of the data processing.

It is furthermore advantageous if either of the particular bus drivers are assigned a common processor as a state machine, which determines a system status for the particular bus driver arrangement from the signals measured on the bus conductors, the individual bus driver arrangements transmitting these measurement signals to the processor via a second multiplexer. As an alternative, a processor is assigned to each bus driver arrangement for determining the system status. The bus driver arrangement states receive, transmit, idle, or error management are understood here as a system status. For the receive status, the processor detects, on the basis of a current modulation on the bus conductors, that data from the sensors and/or an ignition arrangement connected to the bus is being transmitted and thus the particular bus driver arrangement is to be switched to receive. If no current-modulated signal is detected on the bus conductors, the processor either sets the system status at transmit if the bus master wishes to transmit data to the sensors and/or the ignition arrangement, or at idle if the bus master has no data to transmit. Error management, which is to be undertaken in the event of a short-circuit or an interruption in the bus conductor, constitutes another status. In the case of a two-wire line as a bus, the conductors may be interchanged or, for example, an interruption may be isolated.

BRIEF DESCRIPTION OF THE DRAWINGS

Example embodiments of the present invention are illustrated in the drawings and elucidated in detail in the description that follows.

DETAILED DESCRIPTION OF EXAMPLE EMBODIMENTS

In an ignition and/or sensor bus for vehicle restraining systems (airbag and safety belts), a ring or different spur lines are used as configuration. For connection of a ring and/or for a plurality of spur lines, at least two bus driver arrangements are provided in the bus master.

In order to provide a greater bandwidth for future sensor applications, according to the present invention, each bus driver arrangement is able to receive data simultaneously with and independently of other bus driver arrangements. This is achieved according to the present invention by assigning a particular bus driver arrangement a dedicated demodulator, or by different bus driver arrangements sharing one demodulator with a multiplexer connected between them. It is also possible to use a mixed form when there are more than two bus driver arrangements. For example, a dedicated demodulator is provided for one bus conductor which expects intense data traffic, while for other bus conductors, where less intense data traffic is expected, the bus driver arrangements connected to the bus share one demodulator.

In the joint sensor and ignition bus design of Robert Bosch GmbH, Temic Telefunken Microelectronic GmbH, and Siemens Automobiltechnik AG, the data is analyzed in the polling operation according to the present invention by various bus driver arrangements simultaneously with and independently of one another. This permits doubling the bandwidth, while a predefined data transmission rate is preserved. In other words, the transmission rate does not have to be increased for a greater bandwidth.

Figure 1:
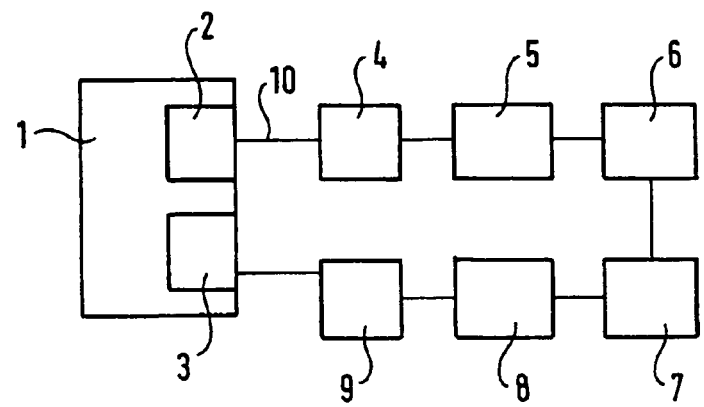
FIG. 1 shows a block diagram of a bus system having a bus master according to an example embodiment of the present invention.

FIG. 1 shows, in the form of a block diagram, a bus master according to the present invention in a ring bus system. Bus master 1 according to the present invention has two bus driver arrangements 2 and 3, which are connected to a bus conductor 10. Sensors 4, 9, are ignition arrangements 5, 6, 7, 8 are connected in the ring bus. Impact sensors such as acceleration sensors, pressure sensors, or temperature sensors are used here as sensors. Ignition arrangement 5, 6, 7, and 8 are used for deploying a restraining device such as air bags or seat belt tighteners. This deployment takes place when sensors 4 and 9 detect an impact situation and this results in a deployment decision. The deployment decision may be made in a central control unit, for example, in bus master 1, or in a distributed manner in the individual ignition arrangements 5, 6, 7, and 8 themselves. The data is transmitted here via bus conductor 10 using current modulation and Manchester coding. A two-wire line is used here as bus conductor 10, the bus conductor also being used for powering bus stations 4 through 9. This is known as power line data transmission. As an alternative, a separate power supply may also be provided. A design of bus conductor 10 as a single-wire line is also possible.

Figure 2:
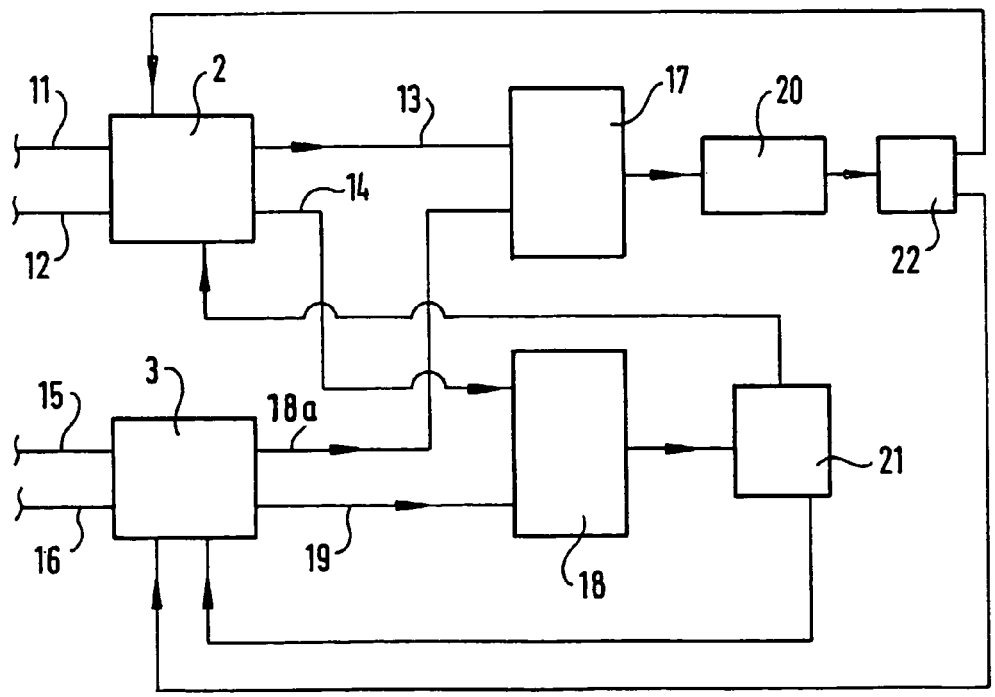
FIG. 2 shows a first block diagram of the bus master according to an example embodiment of the present invention.

FIG. 2 shows the design of bus master 1 according to an example embodiment of the present invention. Bus conductor 10 is illustrated here as a two-wire line having lines 11, 12 and 15, 16. Bus driver arrangement 2 transmits data received to a multiplexer 17 via a line 13. Bus driver arrangement 3 also transmits data received to multiplexer 17 via a line 18a. Multiplexer 17 supplies this data alternatingly to a single demodulator 20, so that demodulator 20 is able to demodulate the data. Sensors 4 and 9 transmit sensor values as data to bus master 1, and the ignition means transmit diagnostic data providing information about whether the ignition means are still operational.

An analyzer 22, which analyzes the demodulated data, is connected downstream from demodulator 20. As a function of the analysis, if appropriate, analyzer 22 transmits, via a first data output, a response to bus driver arrangement 2, which is then transmitted via bus conductor 10. Analyzer 22 performs the same procedure via a second data output to bus driver arrangement 3 if appropriate. In this case, analyzer 22 is a processor of a control unit, which computes a deployment algorithm using the sensor data received over the bus. The response of analyzer 22 is, in the case of deployment, a deployment command to at least one of the ignition arrangements 5 through 8. The diagnostic data received from the ignition arrangements is used to check whether the ignition arrangements are still operational. This function also applies to the analyzers described in the following.

Bus driver arrangement 2 transmits measured quantities of bus conductor 10 to a second multiplexer 18 via a line 14. Bus driver arrangement 3 accomplishes this via line 19. Measured quantities include the power consumption on the high-side terminal of driver arrangement 2, i.e., positively biased line 11, the power consumption on the low-side terminal of driver arrangement 3, i.e., the ground terminal of bus 10, as well as the modulation current and voltage on bus 10. Multiplexer 18 supplies these operational quantities to a processor 21, which acts here as a state machine, processor 21 determining the system status of both driver arrangement 2 and driver arrangement 3 as a function of these measured quantities. For this purpose, processor 21 is connected to bus driver arrangement 2 via a first data output and to bus driver arrangement 3 via a second data output.

A plurality of bus masters may be used in a bus system according to FIG. 1; a multimaster bus system is also possible. Furthermore, instead of a ring design, multiple bus conductors may also be used. A daisy chain design, i.e., a serial bus, or a parallel bus are also possible. The bus master according to the present invention may also be used in mixed bus structures.

Figure 3:
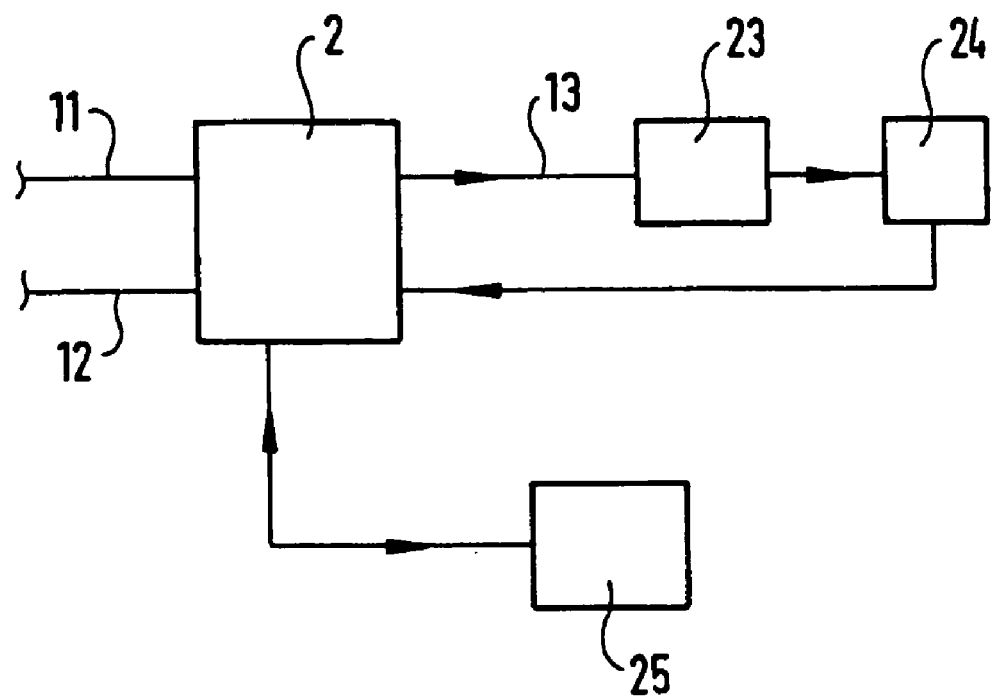
FIG. 3 shows a second block diagram of the bus master according to an example embodiment of the present invention.

FIG. 3 shows, in the form of a block diagram, a section of bus master 1, which only concerns bus driver arrangement 2. Bus conductor 10 is again connected to bus driver arrangement 2 using individual lines 11 and 12. Bus driver arrangement 2 transmits received data, via line 13, to a demodulator 23, which then transmits the demodulated data to an analyzer 24, which transmits, if appropriate, as a function of the analysis, response data which bus driver arrangement 2 then transmits to further bus stations via bus 10.

Bus driver arrangement 2 is connected, via a data input/output, to a processor 25, which determines the status of bus driver arrangement 2 as a function of the measured quantities of bus conductor 10, determined by bus driver 2. System states here include receive, transmit, idle, and error management.

What is claimed is:

1. A bus master for a bus conductor for connection of at least one of impact sensors and an ignition arrangement, comprising:
   at least two bus driver arrangements, each including a respective bus driver, the at least two bus driver arrangements connectable to at least one of the impact sensors and the ignition arrangement via the bus conductor, wherein the at least two bus driver arrangements are able to receive data simultaneously with and independently of one another over the bus conductor to increase the bandwidth;
   a first multiplexer connected downstream of the at least two bus driver arrangements configured to alternate supplying data received by the at least two bus driver arrangements via the bus to a demodulator; and
   a processor having an upstream second multiplexer connected downstream of the at least two bus driver arrangements for alternatingly determining an instantaneous system status of the at least two bus driver arrangements as a function of quantities measured on the bus conductor.

2. The bus master as recited in claim 1, further comprising:
   a single demodulator associated with both of the at least two bus driver arrangements.

3. The bus master as recited in claim 1, wherein each of the at least two bus driver arrangements has dedicated to it a respective one of at least two demodulators.

* * * * *